US012678873B2

(12) United States Patent
Sheen

(10) Patent No.: US 12,678,873 B2
(45) Date of Patent: Jul. 14, 2026

(54) NEAR ZERO DEGREES CROSS-AXIS ANGLE GEAR CUTTER AND METHOD OF GEAR CUTTING USING SUCH A TOOL

(71) Applicant: EATON INTELLIGENT POWER LIMITED, Dublin (IE)

(72) Inventor: Benjamin S. Sheen, Schoolcraft, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 601 days.

(21) Appl. No.: 18/031,673

(22) PCT Filed: Oct. 14, 2021

(86) PCT No.: PCT/EP2021/025404
§ 371 (c)(1),
(2) Date: Apr. 13, 2023

(87) PCT Pub. No.: WO2022/078629
PCT Pub. Date: Apr. 21, 2022

(65) Prior Publication Data
US 2023/0398619 A1     Dec. 14, 2023

Related U.S. Application Data

(60) Provisional application No. 63/091,675, filed on Oct. 14, 2020.

(51) Int. Cl.
B23F 5/16 (2006.01)
B23F 21/10 (2006.01)
(52) U.S. Cl.
CPC .............. B23F 5/163 (2013.01); B23F 21/10 (2013.01)

(58) Field of Classification Search
CPC .. B23F 1/04; B23F 5/163; B23F 5/202; B23F 5/22; B23F 5/24; B23F 5/26; B23F 5/27;
(Continued)

(56) References Cited

U.S. PATENT DOCUMENTS 3,371,395 A * 3/1968 Wildhaber ............ B23F 21/122
407/28
3,570,367 A * 3/1971 Looman .................. B23F 5/163
409/36
(Continued)

FOREIGN PATENT DOCUMENTS

CN 102441711 B * 5/2013
CN 104148747 11/2014
(Continued)

OTHER PUBLICATIONS

International Search Report and Written Opinion; Corresponding PCT Application Serial No. PCT/EP2021/025404 filed Oct. 14, 2021; Authorized Officer Guy Carmichael; Jan. 2, 2022.

*Primary Examiner* — Jennifer H Gay
(74) *Attorney, Agent, or Firm* — Squire Patton Boggs (US) LLP

(57) ABSTRACT

A gear cutter tool for cutting internal gear teeth into a workpiece to form a gear is provided. The gear cutter tool is configured to rotate about a longitudinal gear cutter rotational axis. The workpiece is configured to rotate about a workpiece rotational axis. The gear cutter tool includes a gear cutter having a plurality of cutting teeth. Each cutting tooth of the plurality of cutting teeth having a tooth face that defines a cross-axis tooth angle defined between the tooth face and a line transverse to the longitudinal gear cutter rotational axis. The cross-axis tooth angle is between one and fifteen degrees. A cross-axis tool angle of the gear cutter tool defined between the longitudinal gear cutter rotational (Continued)

axis and the workpiece rotational axis is substantially near zero degrees.

18 Claims, 8 Drawing Sheets

(58) Field of Classification Search
CPC ...... B23F 9/04; B23F 9/06; B23F 9/07; B23F 21/06; B23F 21/08; B23F 21/10; B23F 21/122
See application file for complete search history.

(56) References Cited

U.S. PATENT DOCUMENTS

| | | | | |
|---|---|---|---|---|
| 9,527,148 | B2 * | 12/2016 | Vogel | B23F 21/128 |
| 9,981,330 | B2 * | 5/2018 | Sjoo | B23F 21/066 |
| 10,016,827 | B2 * | 7/2018 | Sheen | B23F 21/10 |
| 10,307,844 | B2 * | 6/2019 | Prock | G05B 19/186 |
| 12,030,130 | B2 * | 7/2024 | Schieke | B23F 19/00 |
| 2015/0063927 | A1 * | 3/2015 | Sjoo | B23F 5/163 |
| | | | | 407/115 |
| 2016/0067804 | A1 * | 3/2016 | Sheen | B23F 1/06 |
| | | | | 409/25 |
| 2016/0158860 | A1 * | 6/2016 | Prock | G05B 19/186 |
| | | | | 409/37 |
| 2016/0228961 | A1 * | 8/2016 | Yanase | B23F 5/163 |
| 2017/0072485 | A1 * | 3/2017 | Weppelmann | B23F 5/163 |
| 2019/0076943 | A1 | 3/2019 | Monden | |
| 2021/0178499 | A1 * | 6/2021 | Weppelmann | B24B 53/053 |
| 2021/0339323 | A1 * | 11/2021 | Schieke | B23F 19/00 |
| 2022/0234125 | A1 * | 7/2022 | Sheen | B23F 5/163 |
| 2023/0398619 | A1 * | 12/2023 | Sheen | B23F 5/163 |
| 2024/0335893 | A1 * | 10/2024 | Bogaerts | B23F 19/10 |
| 2025/0229350 | A1 * | 7/2025 | Marx | B23F 21/10 |

FOREIGN PATENT DOCUMENTS

| | | | | |
|---|---|---|---|---|
| CN | 104416208 | | 3/2015 | |
| CN | 105916621 | | 8/2016 | |
| CN | 107405706 | | 11/2017 | |
| CN | 108243609 | | 7/2018 | |
| CN | 111615436 | | 9/2020 | |
| DE | 102014008475 | B4 * | 2/2023 | B23F 19/102 |
| EP | 0323868 | A1 * | 7/1989 | B23F 5/16 |
| EP | 2845675 | | 3/2015 | |
| EP | 3043945 | B1 * | 9/2021 | B23F 5/163 |
| EP | 4566745 | A1 * | 6/2025 | B23F 21/10 |
| GB | 191414794 | A * | 7/1914 | B23F 21/10 |
| JP | 2016508453 | | 3/2016 | |
| JP | 2018069349 | | 5/2018 | |
| JP | 6744096 | | 8/2020 | |
| KR | 20160044024 | A * | 4/2016 | B23F 5/163 |
| SE | 1350983 | A1 * | 2/2015 | B23F 15/00 |
| WO | WO-2015185186 | A1 * | 12/2015 | B23F 21/005 |
| WO | 2021073773 | | 4/2021 | |
| WO | WO-2021073773 | A2 * | 4/2021 | B23C 5/28 |

* cited by examiner

NEAR ZERO DEGREES CROSS-AXIS ANGLE GEAR CUTTER AND METHOD OF GEAR CUTTING USING SUCH A TOOL

CROSS-REFERENCE TO RELATED APPLICATIONS

This application claims the benefit of U.S. Patent Application No. 63/091,675 filed Oct. 14, 2020. The disclosure of the above application is incorporated herein by reference.

FIELD

The present disclosure relates generally to a gear cutter that forms gear teeth on an inner diameter of a working piece and a related coolant delivery assembly.

BACKGROUND

Gear manufacturers utilize various machining processes and corresponding tools to produce gears. Exemplary processes can include hobbing, shaping, milling, shear cutting and grinding. The process selected by the gear manufacturer can depend on the type of gear being machined and the tolerances within which the gear is produced. Other considerations in selecting the method can include the size of the gear, the configuration of internal sections or flanges, the quantity of gears to be produced, and gear-to-pinion ratio and costs.

Gear teeth adjacent to other part features are currently limited to production methods such as shaping or rack rolling. For internal gear teeth, shaping or broaching are the traditional manufacturing methods, but each process is limited to the part type. In other words, broaching must have a completely un-obstructed part layout so the tool can pass completely through the part. Gear shaping allows teeth to be cut against an interfering surface, but is inherently slow in terms of machine cycle and flexibility.

Gear skiving is a recent development in gear manufacturing that reduces traditional gear shaping cycle times by up to 80%. While extremely fast, traditional skiving is limited to cutter clearances and part configurations.

SUMMARY

A gear cutter tool for cutting internal gear teeth into a workpiece to form a gear is provided. The gear cutter tool is configured to rotate about a longitudinal gear cutter rotational axis. The workpiece is configured to rotate about a workpiece rotational axis. The gear cutter tool includes a gear cutter having a plurality of cutting teeth. Each cutting tooth of the plurality of cutting teeth having a tooth face that defines a cross-axis tooth angle defined between the tooth face and a line transverse to the longitudinal gear cutter rotational axis. The cross-axis tooth angle is between one and fifteen degrees. A cross-axis tool angle of the gear cutter tool defined between the longitudinal gear cutter rotational axis and the workpiece rotational axis is substantially near zero degrees.

According to additional features, the cross-axis tool angle is between one and six degrees. In other features, the cross-axis tool angle is between one and five degrees. In other features, the cross-axis tool angle is between one and four degrees. In still other features, the cross-axis tool angle is three degrees. In still other features, the cross-axis tool angle is two degrees. In still other features, the cross-axis tool angle is one degree. In some arrangements, the longitudinal gear cutter axis is transverse relative to the workpiece. The cross-axis tooth angle can be between ten and fifteen degrees. In other arrangements, the cross-axis tooth angle can be between one and ten degrees.

A method of cutting internal gear teeth into a workpiece to form a gear using a gear cutter tool includes providing a gear cutter having a plurality of cutting teeth. Each cutting tooth of the plurality of cutting teeth has a tooth face that defines a cross-axis tooth angle defined between the tooth face and a line transverse to a longitudinal gear cutter rotational axis. The cross-axis tooth angle is between one and fifteen degrees. The workpiece is rotated about a workpiece axis. The gear cutter tool is rotated about a longitudinal gear cutter axis. The workpiece and longitudinal gear cutter axes define a cross-axis tool angle therebetween. The workpiece is cut with the plurality of teeth. The cross-axis tool angle is substantially near zero degrees.

According to additional features, the cross-axis tool angle is between one and six degrees. In other features, the cross-axis tool angle is between one and five degrees. In other features, the cross-axis tool angle is between one and four degrees. In still other features, the cross-axis tool angle is three degrees. In still other features, the cross-axis tool angle is two degrees. In still other features, the cross-axis tool angle is one degree. The cross-axis tooth angle can be between ten and fifteen degrees. In other arrangements, the cross-axis tooth angle can be between one and ten degrees.

BRIEF DESCRIPTION OF THE DRAWINGS

The present disclosure will become more fully understood from the detailed description and the accompanying drawings, wherein.

DETAILED DESCRIPTION

Figure 1A:
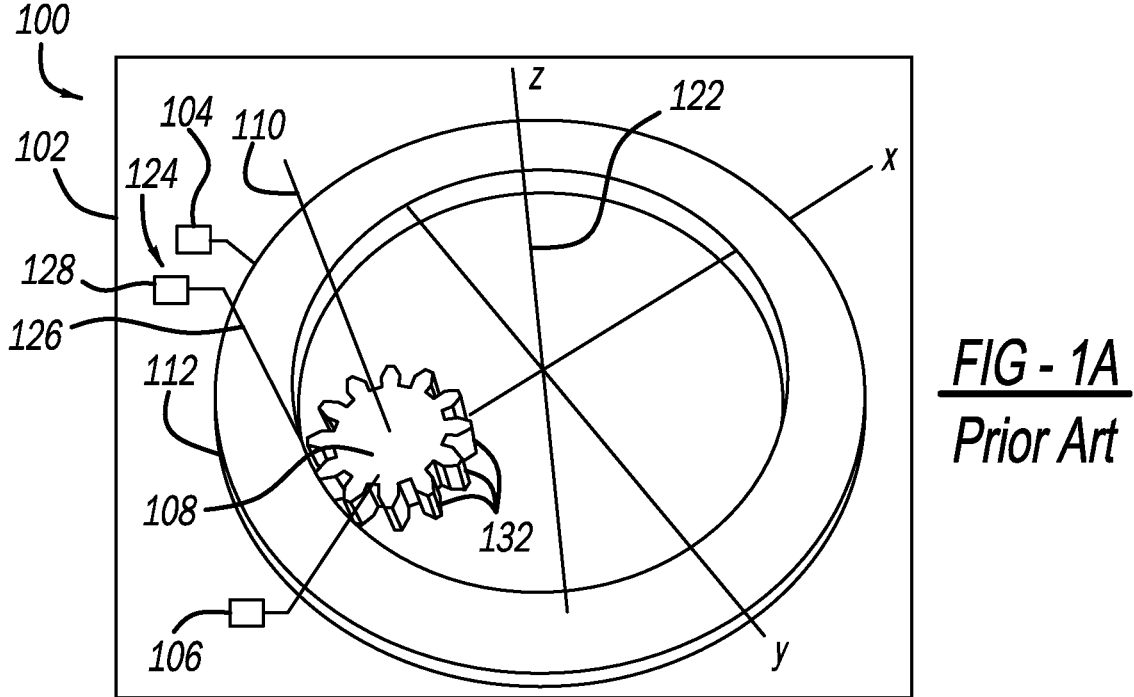
FIG. 1A is a schematic, perspective view of an exemplary prior art gear cutter system including a gear cutter that is configured to cut an internal gear in a blank orientation.
Figure 1B:
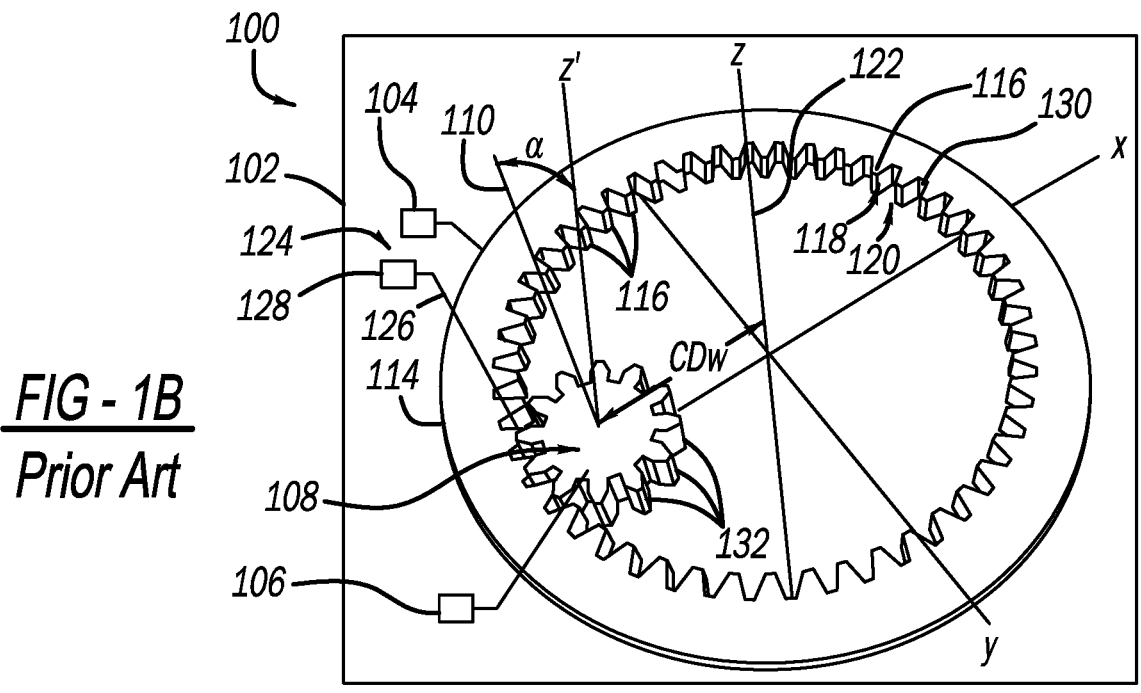
FIG. 1B is a schematic, perspective view of the system of FIG. 1A, illustrating the cutter having produced a precision internal gear in a final orientation.
Figure 2:
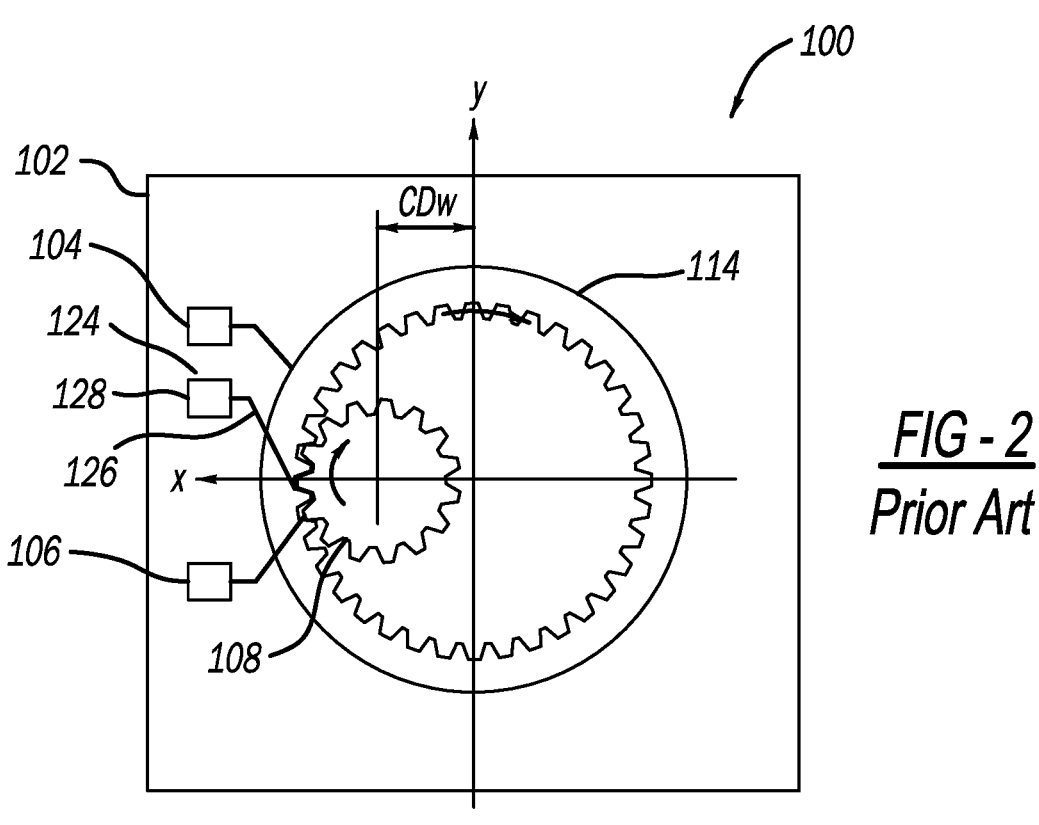
FIG. 2 is a schematic end view of the system of FIG. 1A, illustrating a center distance between an axis of rotation of the cutter and an axis of rotation of the internal gear.
Figure 3:
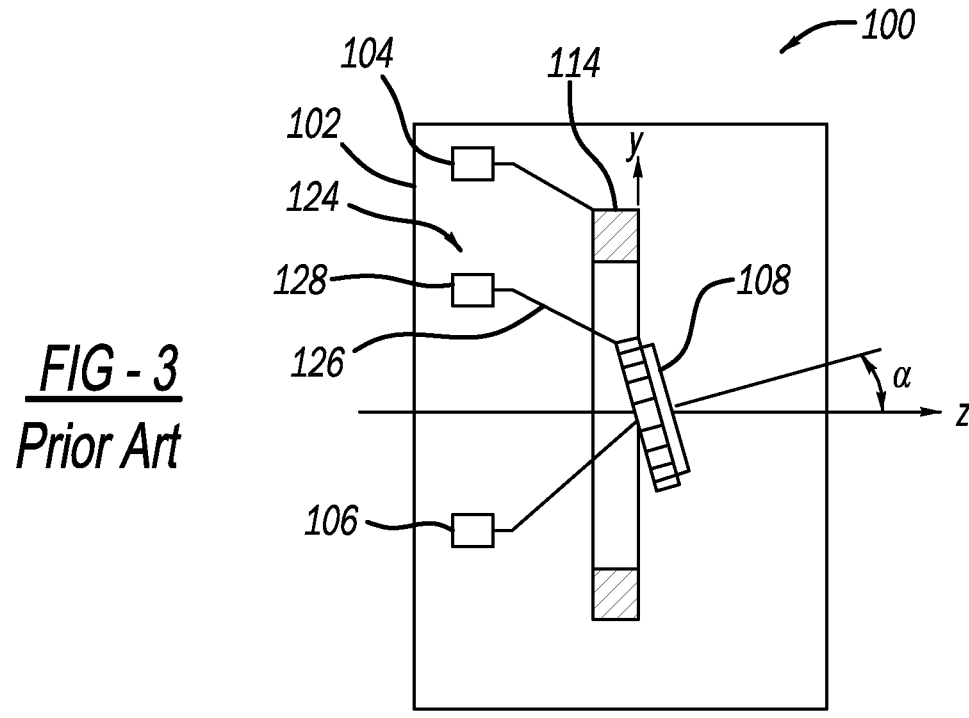
FIG. 3 is a schematic side view of the cutter and the internal gear of FIG. 1A, illustrating a cross-axis angle between an axis of rotation for the cutter and an axis of rotation for the internal gear.

An exemplary involute gear cutter system (hereinafter "system") includes a computer numerically controlled (CNC) machine tool and modified tooth proportion gear cutter (hereinafter "cutter") configured to cut a gear in a blank orientation to remove shavings from the gear in multiple passes so as to produce a precision gear in its final orientation. The CNC machine tool includes a chuck and an active sub-spindle, i.e. controlled rotating motion through CNC controls. The cutter can be mounted on the spindle, and the gear in the blank configuration may be attached to the chuck. More specifically, the cutter can have a plurality of cutting teeth, and each one of the cutting teeth can have a pair of cutting edges configured to cut the gear in the blank orientation to provide the gear in the final orientation.

In the final orientation, the gear has an involute tooth profile including a plurality of cut teeth and a plurality of valleys therebetween. The cutting edges may be configured to cut the gear in the blank orientation, such that the gear in the final orientation includes an active profile section and an operating pitch diameter that are spaced apart from one another. Thus, the cutter can apply a generally constant force in a single or unilateral direction along the surface of the gear to increase the accuracy of machining the gear within, for example, a 0.0010 inch tolerance, without requiring special cutting tools or cutting systems.

Referring to FIGS. 1A-3, an exemplary prior art system 100 includes a computer numerically controlled (CNC) machine tool 102 having in part a chuck 104 and a spindle 106. The system 100 further includes a cutter 108 that is attached to the spindle 106, which is in turn configured to rotate the cutter 108 about a cutting axis 110 so as to cut a gear 112 in a blank orientation (FIG. 1A) and produce the gear 114 in the final orientation (FIG. 1B). The cutter 108 in this form is an external gear configured to cut an internal gear 112 in a blank orientation to produce the internal gear 114 in the final orientation. The internal gear 114 in the final orientation has a plurality of cut teeth 116. The teeth 116 have an involute tooth profile 118 including an active profile section 120, which is a portion of each tooth surface configured to contact the opposing teeth of a meshed gear.

The gear 112 in the blank orientation is mounted to the chuck 104, which is configured to rotate the gear 112 about a cut axis 122 (FIG. 1A), such that the cut axis 122 and the cutting axis 110 are spaced apart from one another by a center distance CDw. In addition, the cut axis 122 and the cutting axis 110 are disposed at a cross-axis angle α with respect to one another when the gear 114 is in the final orientation. As used herein, the term "cross-axis" is an angle that defines the difference between the two rotational axes of the gear workpiece and the cutting tool.

The system 100 can further include a flushing device 124 configured to deliver a fluid to the gear 112 to remove shavings, chips or dust from the gear 112 when the spindle 106 rotates the cutter 108 to cut the gear 112 in multiple passes. The fluid can also remove heat from the system 100. In one example, the flushing device 124 is a fluid line 126 communicating with a reservoir 128 to supply water, nitrogen gas or another fluid to the external gear 112. In the final orientation, the gear 114 has an involute tooth profile including a plurality of cut teeth 116 and a plurality of valleys therebetween. The involute tooth profile 118 includes the active profile section 120, and the operating pitch diameter is spaced apart from the same when the gear 114 is in its final orientation. Additional description of a prior art skiving tool may be found in commonly owned U.S. Pat. No. 10,016,827 the contents of which are expressly incorporated herein by reference.

The present disclosure allows the skiving of gear teeth previously not possible with current methods due to its ability to accurately cut the workpiece while eliminating certain cutter/workpiece interferences. Traditional skiving methods consist of a rotating gear cutter mounted on an axis that is not the same as an axis of the workpiece. Traditional skiving methods are limited by workpiece clearances when holding the cutting tool at its rotating cross-axis angle. The cross-axis angle of the gear cutter creates a cutting action that generates a chip. More cross-axis angle allows more cutting action and increased chip formation. The desired cross-axis angle for conventional systems is typically 20 degrees but may be a lower angle such as 15 or 12 degrees. At such design parameters, the clearance of the tool must be considered and limits the applications of the skiving process.

As will be described in detail herein, the present disclosure allows the axis of the workpiece and the axis of the tool to be the same or essentially the same (within substantially between one and six degrees), eliminating the cross-axis angle completely or greatly reducing it. Smaller cross-axis angles are desired in situations where small clearances exist between the cutter and the workpiece geometry. The proposed disclosure allows very low cross-axis tool angles by adding localized tooth face angle modifications that give better cutting action while still allowing very small operating cross-axis angles. In this regard, minimizing or eliminating the cross-axis angle of the tool eliminates interference points. Minimizing or eliminating the cross-axis angle allows the tool to reach areas previously not possible.

Traditional gear skiving tools are produced at a helix angle equal to the cross-axis angle of the skiving machine. This current state of the art is readily available commercially. The formation of the chip is created when the cross-axis angle of the cutter swipes across the workpiece tooth and slices away material. The cross-axis angle creates this cutting action and is made possible by the cross-action of the machine (gear cutter). The instant disclosure moves the cross-angle from a macro-level workpiece and machine axis to a micro-level local to each tooth on the gear cutter itself. This allows the cutter to be held at a near zero degree cross-axis angle while still providing the cross-axis necessary for the chip formation by utilizing the local cross-axis angle on each tooth of the cutter. As used herein, near or substantially zero is used to refer to angles between one and six degrees. A benefit of this is that the tool can be moved closer to interference locations on the workpiece previously not possible. In this regard, the present disclosure opens up skiving to many more types of workpieces, shoulder work, and clearance challenged applications. Moreover, the present disclosure opens up the skiving process to machines without a cross-axis between the workpiece and the cutting tool axes. The machine tool cost can drop significantly by utilizing standard machine tools versus custom-built skiving machines.

Figure 4:
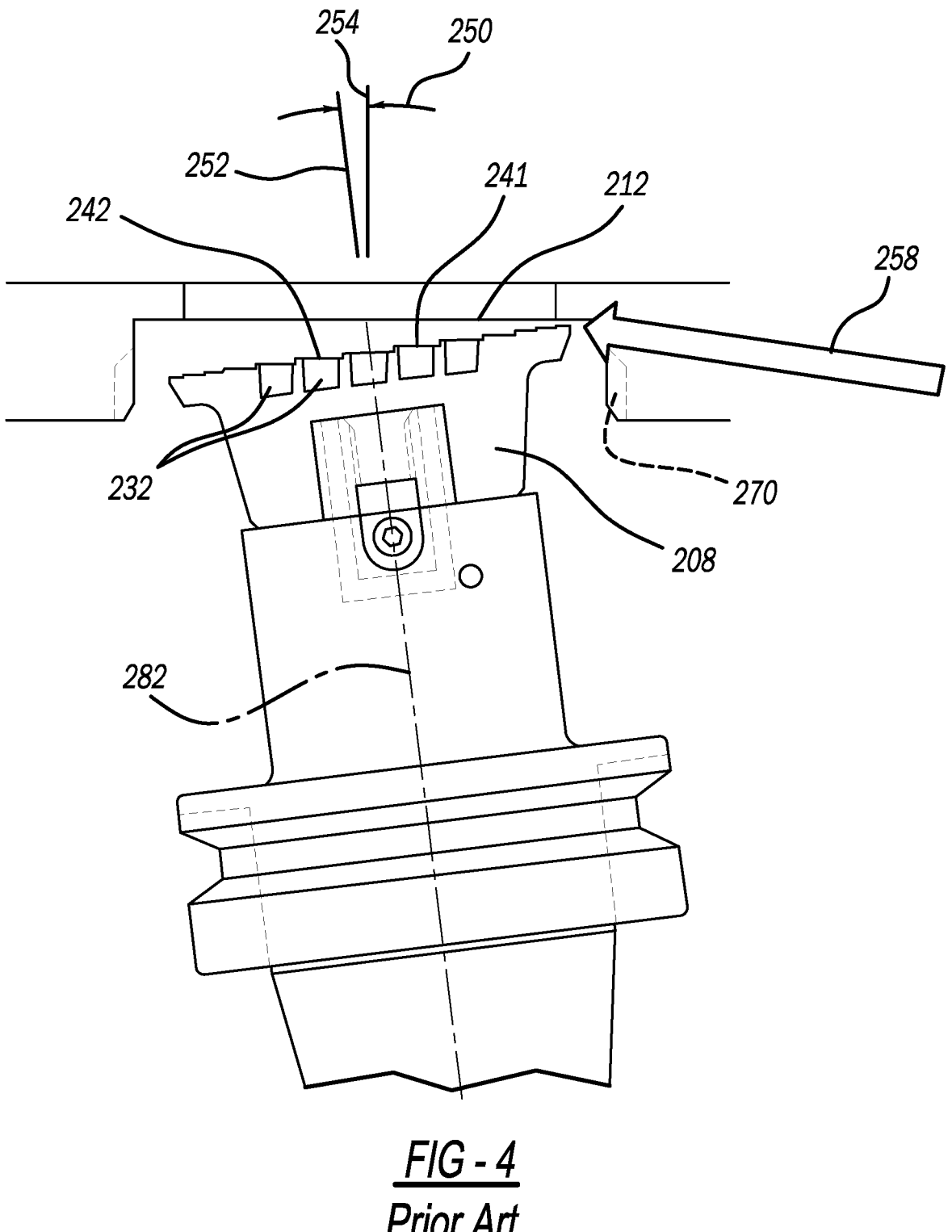
FIG. 4 is a side schematic view of the prior art gear cutter.

With reference now to FIG. 4, a gear cutter or cutting tool constructed in accordance to one prior art example is shown and generally identified at reference 208. The gear cutter 208 includes a plurality of teeth 232. Each tooth 232 defines a tooth face 241 having a tooth face angle 242 relative to the workpiece 212. A cross-axis angle 250 is defined between a longitudinal rotational axis 252 of the gear cutter 208 and a transverse axis 254 through the workpiece 212 (also referred to herein as a rotational axis of the workpiece 212). The cross-axis angle 250 of the gear cutter 208 creates small clearance distance in certain locations 258 of the workpiece 212. A maximum cross-axis angle depends on workpiece geometry and clearances. As shown in FIG. 4, the tooth face angle 242 is parallel to a face of the workpiece 212. The workpiece 212 is cut at 270 by the teeth 232. During cutting, both the gear cutter 208 and the workpiece 212 are rotating, (the gear cutter 208 around longitudinal cutting axis 282, the workpiece 212 around the rotational axis 254) but at different revolutions per minute (RPM).

Figure 5:
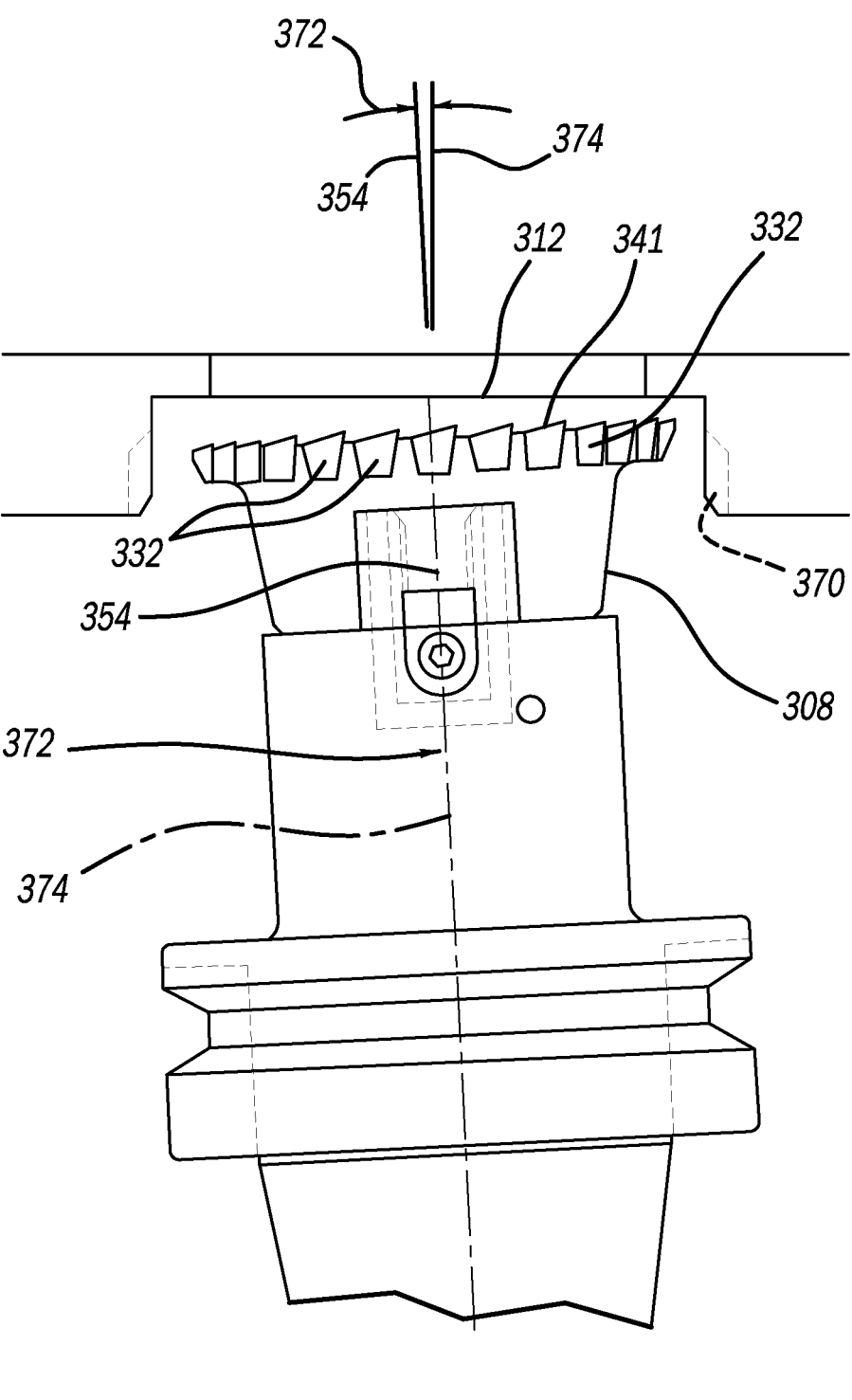
FIG. 5 is a side schematic view of a gear cutter according to one example of the present disclosure.
Figure 6:
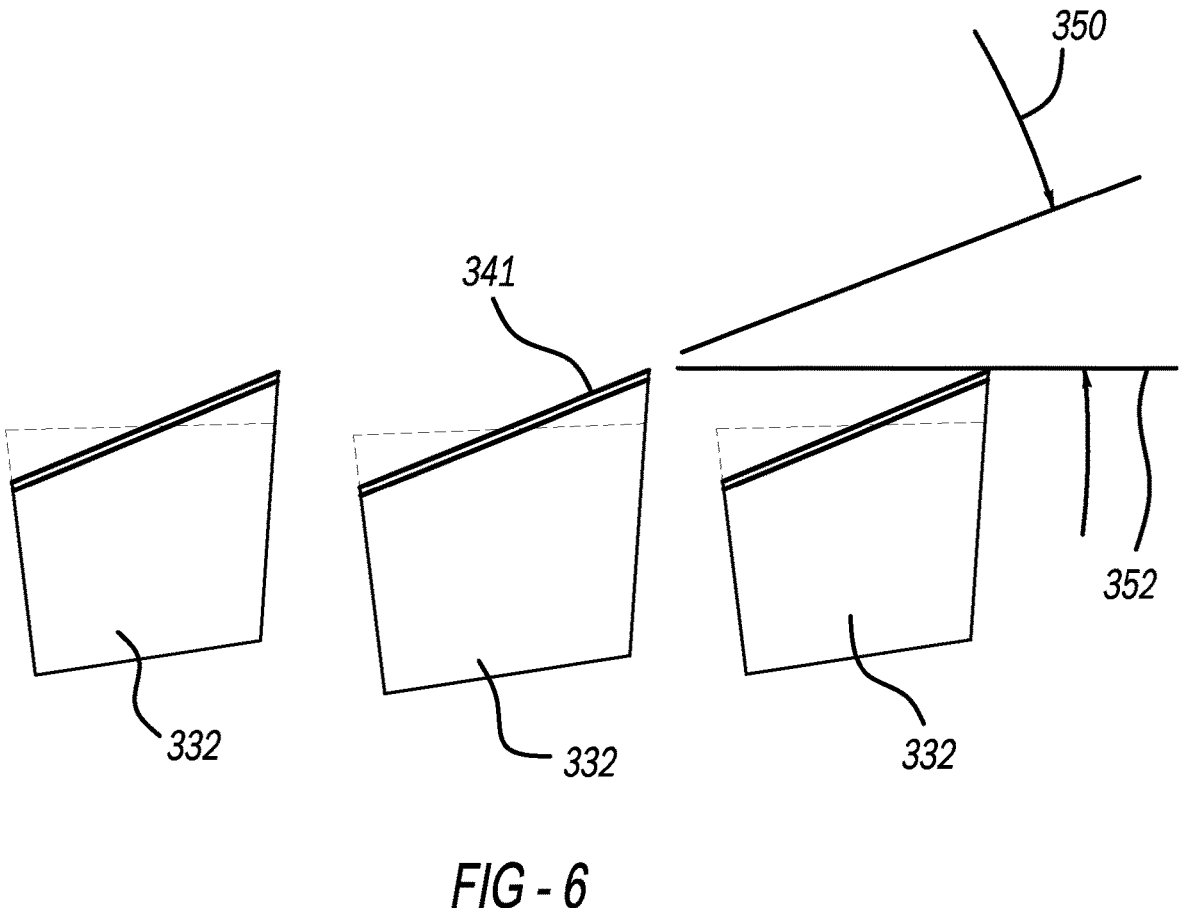
FIG. 6 is a schematic illustration of a proposed tooth surface superimposed over a traditional tooth leading surface.

With reference to FIGS. 5 and 6, a gear cutter tool constructed in accordance to one example of the present disclosure is shown and generally identified at reference 308. The gear cutter 308 includes a plurality of teeth 332. Each tooth 332 defines a tooth face 341. Each tooth 332 has a cross-axis tooth angle 350 localized to each tooth 332, not the entire cutter 308. The cross-axis angle 350 is non-zero and defined as an angle between the tooth face 341 and a line 352 transverse to a longitudinal axis (or axis of rotation) 354 of the gear cutter 308. According to the present disclosure, it has been shown that providing the tooth angle 350 between one and fifteen degrees, the gear cutter tool 308 can be arranged at improved angles (relative to the workpiece) to reach areas of the workpiece that were not previously possible.

By creating a local cross-axis tooth angle 350 at each tooth 332, a cross-axis tool angle 372 defined between the longitudinal axis 354 of the gear cutter 308 and a rotational axis 374 of the workpiece 312 can be greatly reduced to near zero degrees. Again, it has been shown that angles between one and six degrees can be used to achieve successful cutting and improved tool reach. In this regard, the longitudinal axis 354 of the gear cutter 308 can be arranged at or near a parallel relationship with the rotational axis 374 of the workpiece 312. Rather than requiring the entire gear cutter 308 to be tilted (see FIG. 4, prior art), each tooth face 341 is its own local cross-axis angle 350. Skiving can therefore be successfully carried out up to a shoulder of the workpiece 312. Furthermore, a path of the cutting tool 308 can penetrate further into areas of the workpiece 312 previously limited by part geometry. The workpiece 312 is cut at 370 (internal spline of workpiece FIG. 5) by the teeth 332. During cutting, both the gear cutter 308 and the workpiece 312 are rotating, (the gear cutter 308 around longitudinal cutting axis 372, the workpiece 312 around the rotational axis 274) but at different RPM.

Figure 7B:
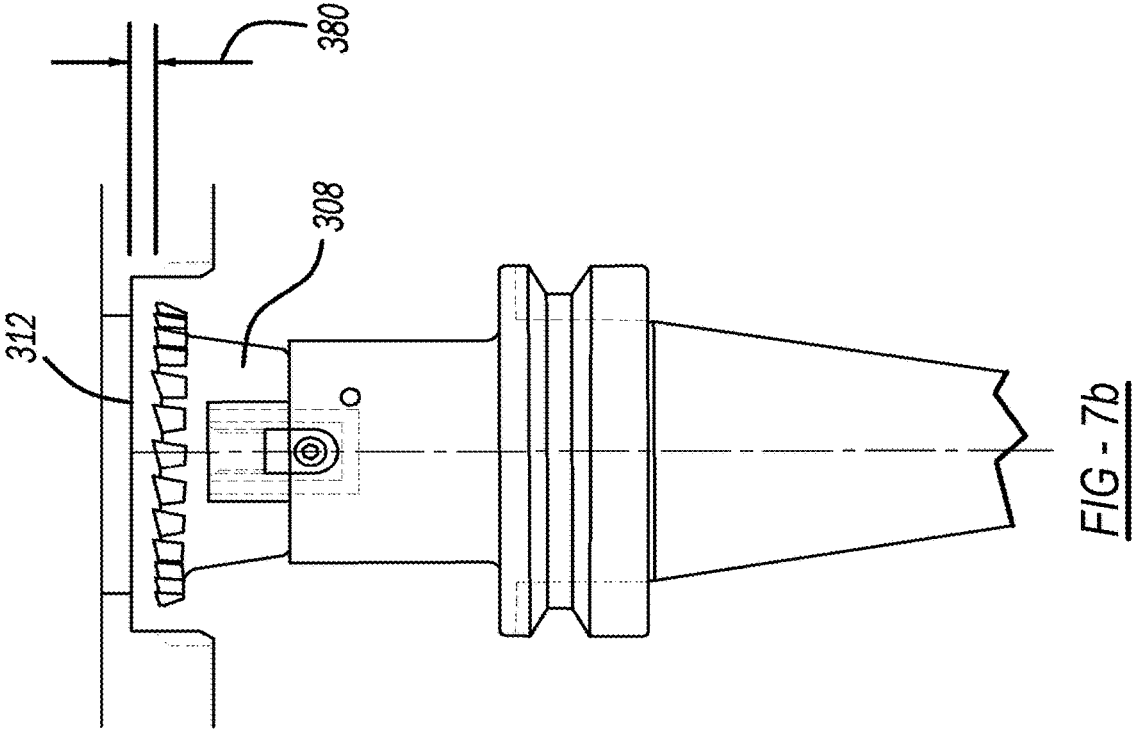
FIG. 7b is a schematic of a gear cutter constructed in accordance with the present disclosure.
Figure 7A:
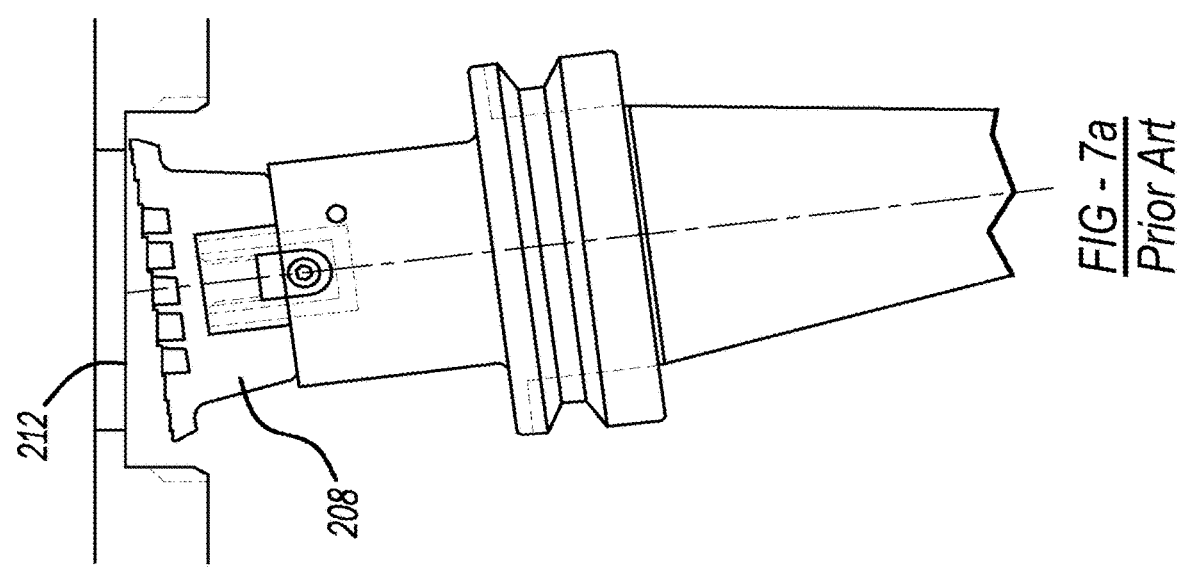
FIG. 7a is a schematic of an exemplary prior art gear cutter.
Figure 8B:
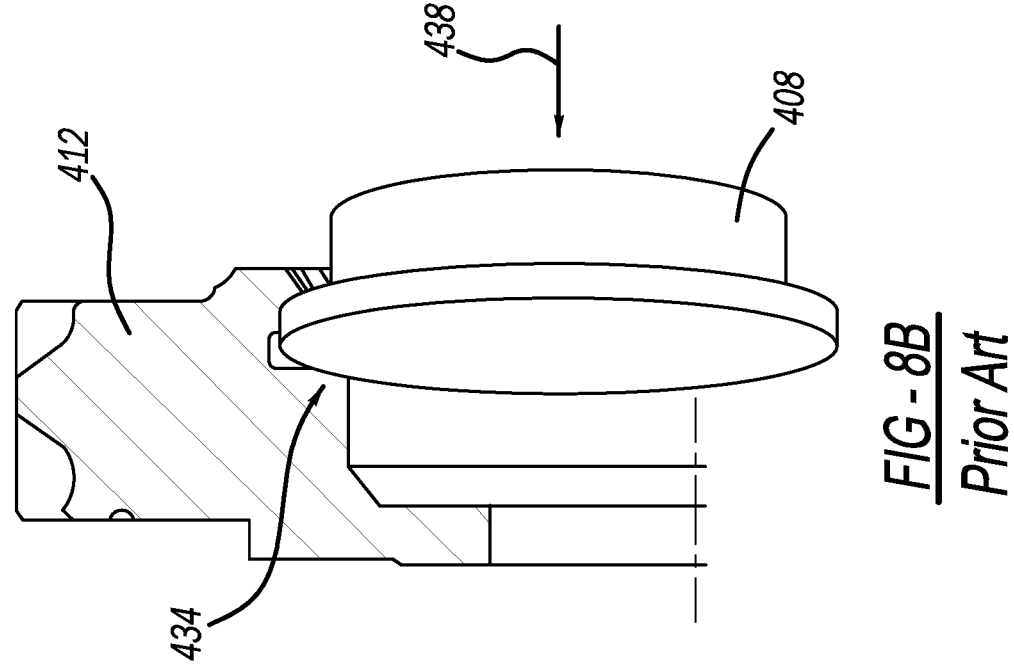
FIG. 8B is a sectional view of a conventional gear cutter shown at 6 degrees cross-axis angle illustrating interference with a workpiece.
Figure 8A:
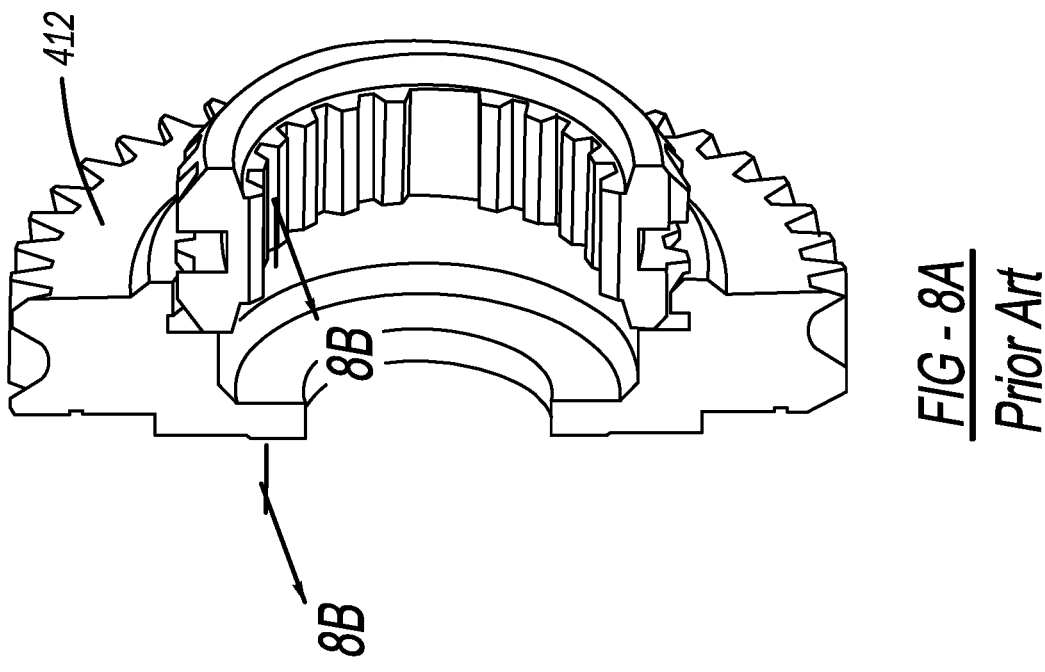
FIG. 8A is a sectional view of a conventional gear.
Figure 9B:
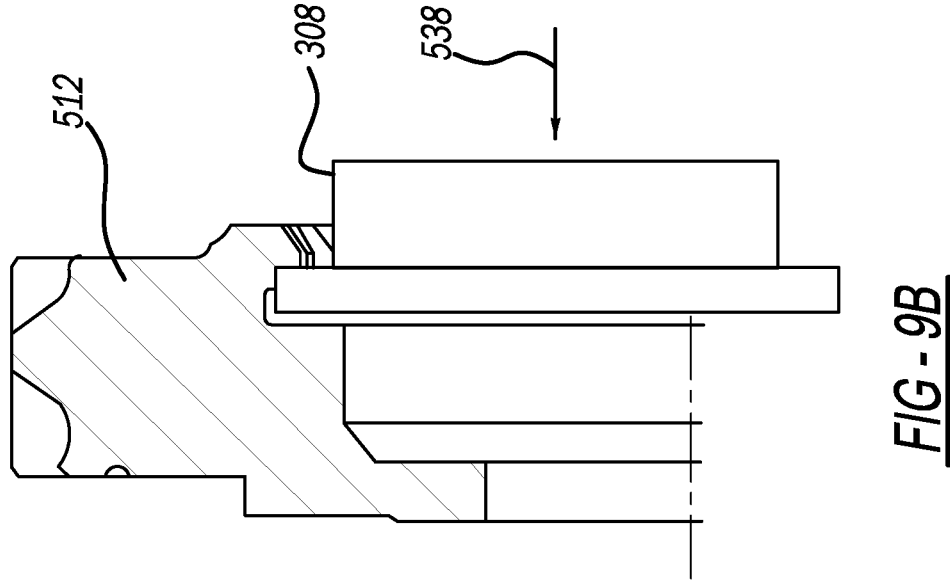
FIG. 9B is a sectional view of a gear cutter constructed in accordance to the present disclosure and shown at substantially near zero degrees cross-axis angle illustrating no interference with a workpiece.
Figure 9A:
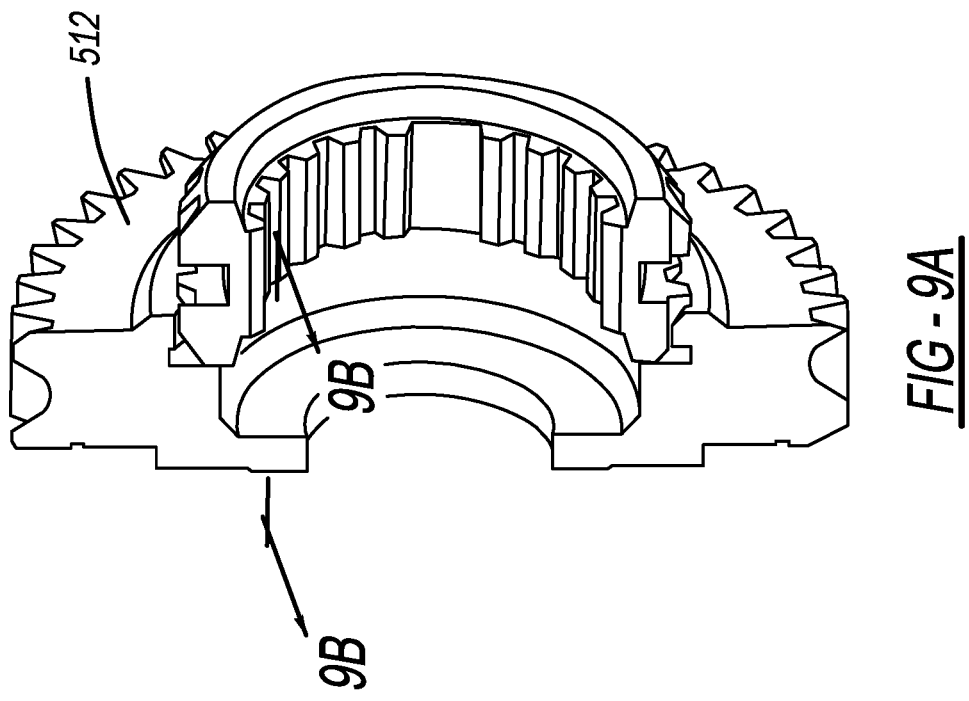
FIG. 9A is a sectional view of a conventional gear.

FIG. 7 shows a comparison of the prior art gear cutter 208 and workpiece 212 with the gear cutter 308 and workpiece 312 according to the present disclosure. It will be appreciated that in FIG. 7, the cross-axis tool angle 372 is illustrated more accurately between one and six degrees (and is more difficult to see, compared to the exaggerated depiction of that same angle in FIG. 5). Notably, additional clearance 380 is provided with the gear cutter 308 before interference with the workpiece 312. FIG. 8A shows a sectional view of a conventional gear 412. FIG. 8B shows a conventional gear cutter 408 shown at 6 degrees cross-axis angle illustrating interference at reference 434 with a workpiece 412 as the gear cutter 408 is advanced along feed axis 438. As illustrated, skiving is not possible due to interference 434 between the gear cutter 408 and the workpiece 412. FIG. 9A shows a sectional view of a conventional gear 512. FIG. 9B is a sectional view of the gear cutter 308 constructed in accordance to the present disclosure and shown at substantially near zero degrees cross-axis angle as the gear cutter 308 is advanced along a feed axis 538 illustrating no interference with a workpiece.

With traditional skiving machines, the machine must have the ability to provide a cross-axis. In this regard, instead of simply a horizontal milling machine, a skiving machine must also provide the user with the ability to provide a fifth axis table or other tilting axis to achieve a desired cross-axis. The present disclosure removes this requirement such that the end result can be achieved on much less expensive equipment that does not provide the additional axis of adjustment.

The foregoing description of the many examples has been provided for purposes of illustration and description. It is not intended to be exhaustive or to limit the disclosure. Individual elements or features of a particular aspect are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A gear cutter tool for cutting internal gear teeth into a workpiece to form a gear, the gear cutter tool configured to rotate about a longitudinal gear cutter rotational axis, the workpiece configured to rotate about a workpiece rotational axis, the gear cutter tool comprising:
   a gear cutter having a plurality of cutting teeth, each cutting tooth of the plurality of cutting teeth having a tooth face that defines a cross-axis tooth angle defined between the tooth face and a line transverse to the longitudinal gear cutter rotational axis, wherein the cross-axis tooth angle is between one and fifteen degrees, wherein a cross-axis tool angle of the gear cutter tool defined between the longitudinal gear cutter rotational axis and the workpiece rotational axis is substantially near zero degrees.

2. The gear cutter tool of claim 1 wherein the cross-axis tool angle is between one and six degrees.

3. The gear cutter tool of claim 2 wherein the cross-axis tool angle is between one and five degrees.

4. The gear cutter tool of claim 3 wherein the cross-axis tool angle is between one and four degrees.

5. The gear cutter tool of claim 4 wherein the cross-axis tool angle is three degrees.

6. The gear cutter tool of claim 4 wherein the cross-axis tool angle is two degrees.

7. The gear cutter tool of claim 4 wherein the cross-axis tool angle is one degree.

8. The gear cutter tool of claim 1 wherein the cross-axis tooth angle is between ten and fifteen degrees.

9. The gear cutter tool of claim 8 wherein the cross-axis tooth angle is between one and ten degrees.

10. A method of cutting internal gear teeth into a workpiece to form a gear using a gear cutter tool, the method comprising:
   providing a gear cutter having a plurality of cutting teeth, each cutting tooth of the plurality of cutting teeth having a tooth face that defines a cross-axis tooth angle defined between the tooth face and a line transverse to a longitudinal gear cutter rotational axis, wherein the cross-axis tooth angle is between one and fifteen degrees;
   rotating the workpiece about a workpiece axis; rotating the gear cutter tool about a longitudinal gear cutter axis, the workpiece and longitudinal gear cutter axes defining a cross-axis tool angle therebetween; and cutting the workpiece with the plurality of teeth, wherein the cross-axis tool angle is substantially near zero degrees.

11. The method of claim 10 wherein the cross-axis tool angle is between one and six degrees.

12. The method of claim 11 wherein the cross-axis tool angle is between one and five degrees.

13. The method of claim 12 wherein the cross-axis tool angle is between one and four degrees.

14. The method of claim 13 wherein the cross-axis tool angle is three degrees.

15. The method of claim 13 wherein the cross-axis tool angle is two degrees.

16. The method of claim 13 wherein the cross-axis tool angle is one degree.

17. The method of claim 10 wherein the cross-axis tooth angle is between ten and fifteen degrees.

18. The method of claim 10 wherein the cross-axis tooth angle is between one and ten degrees.

* * * * *